(12) United States Patent
Tang et al.

(10) Patent No.: US 9,406,317 B1
(45) Date of Patent: Aug. 2, 2016

(54) PERPENDICULAR MAGNETIC RECORDING (PMR) WRITE HEAD WITH IMPROVED SHAPES OF SIDE SHIELD AND MAIN POLE

(71) Applicant: Headway Technologies, Inc., Milpitas, CA (US)

(72) Inventors: Yuhui Tang, Milpitas, CA (US); Yaguang Wei, Pleasanton, CA (US); Jiun-Ting Lee, Sunnyvale, CA (US); Ping-Wei Zhuang, Livermore, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 14/819,534

(22) Filed: Aug. 6, 2015

(51) Int. Cl.
*G11B 5/31* (2006.01)
*G11B 5/127* (2006.01)
*G11B 5/11* (2006.01)

(52) U.S. Cl.
CPC ............... *G11B 5/1278* (2013.01); *G11B 5/11* (2013.01); *G11B 5/3116* (2013.01)

(58) Field of Classification Search
None
See application file for complete search history.

(56) References Cited

U.S. PATENT DOCUMENTS

| | | | | |
|---|---|---|---|---|
| 8,400,731 B1 * | 3/2013 | Li | ................... | G11B 5/3116 360/119.04 |
| 8,427,781 B1 | 4/2013 | Sasaki et al. | | |
| 8,477,452 B2 | 7/2013 | Sasaki et al. | | |
| 8,724,259 B1 * | 5/2014 | Liu | ................... | G11B 5/1278 360/125.15 |
| 8,767,347 B1 | 7/2014 | Sasaki et al. | | |
| 8,792,210 B2 | 7/2014 | de la Fuente et al. | | |
| 2011/0097601 A1 * | 4/2011 | Bai | ................... | G11B 5/1278 428/815 |
| 2013/0242431 A1 * | 9/2013 | Hosomi | ................... | G11B 5/235 360/119.02 |
| 2015/0085402 A1 * | 3/2015 | Bashir | ................... | G11B 5/3116 360/235.4 |
| 2015/0380016 A1 * | 12/2015 | Sasaki | ................... | G11B 5/3163 360/119.02 |

OTHER PUBLICATIONS

"The Feasibility of Magnetic Recording at 10 Terabits Per Square Inch on Conventional Media," by Roger Wood et al., IEEE Transactions on Magnetics, vol. 45, No. 2, Feb. 2009, pp. 917-923.
Co-pending U.S. Appl. No. 14/690,693, filed Apr. 20, 2015, "High Moment Side Shield Design for Area Density Improvement of Perpendicular Magnetic Recording (PMR) Writer," by Yue Liu et al., 54 pgs.
Co-pending U.S. Appl. No. 14/813,887, filed Jul. 30, 2015, "Perpendicular Magnetic Recording (PMR) Writer with Minimized Internal Flux Shunting," by Yuhui Tang et al., 40 pgs.

* cited by examiner

*Primary Examiner* — Will J Klimowicz
(74) *Attorney, Agent, or Firm* — Saile Ackerman LLC; Stephen B. Ackerman (57) ABSTRACT

A perpendicular magnetic recording writer is disclosed with a side shield separated from a write pole side by a gap layer at an air bearing surface (ABS) where the side shield has a first sidewall facing the write pole with an end at height (h1) from the ABS, and a second sidewall at height h1 that is parallel to the ABS. The write pole side is curved such that a first portion proximate to the ABS is at an angle of 0 to 40 degrees with respect to a center plane formed orthogonal to the ABS, and a second section proximate to a corner where the curved side connects with a flared main pole side is formed substantially parallel to the second sidewall. When h1 is 30-80 nm, and the corner is 80-150 nm from the ABS, overwrite is improved while cross-track field gradient is enhanced.

8 Claims, 6 Drawing Sheets

PERPENDICULAR MAGNETIC RECORDING (PMR) WRITE HEAD WITH IMPROVED SHAPES OF SIDE SHIELD AND MAIN POLE

RELATED PATENT APPLICATIONS

This application is related to the following: Ser. No. 14/690,693, filing date Apr. 20, 2015; and Ser. No. 14/813,887, filing date Jul. 30, 2015; both assigned to a common assignee and herein incorporated by reference in their entirety.

TECHNICAL FIELD

The present disclosure relates to a PMR write head wherein the main pole has a greater volume within 150 nm of the air bearing surface (ABS) by increasing the curvature on the narrow write pole portion at the ABS and shrinking the height of the side shield portions facing the write pole to less than 80 nm thereby reducing internal flux leakage from main pole to side shields, improving overwrite (OW), and enhancing the cross-track field gradient.

BACKGROUND

A PMR write head typically has a main pole with a small surface area at an air bearing surface (ABS), and coils that conduct a current and generate a magnetic flux in the main pole such that the magnetic flux exits through a write pole tip and enters a magnetic medium (disk) adjacent to the ABS. Magnetic flux is used to write a selected number of bits in the magnetic medium and typically returns to the main pole through two pathways including a trailing loop and a leading loop. The trailing loop generally has a trailing shield structure separated from the main pole by a write gap, and the leading loop includes the leading shield that is separated from the main pole by a leading gap. Side shields are relied on to enhance the cross-track field gradient.

Shingled magnetic recording (SMR) is a form of PMR and has been proposed for future high density magnetic recording by R. Wood et al. in "The Feasibility of Magnetic Recording at 10 Terabits Per Square Inch on Conventional Media", IEEE Trans. Magn., Vol. 45, pp. 917-923 (2009). In this scheme, tracks are written in a sequential manner from an inner diameter (ID) to an outer diameter (OD), from OD to ID, or from OD and ID towards a middle diameter (MD) in a radial region of a disk in a hard disk drive (HDD). In other words, a first track is partially overwritten on one side when a second track adjacent to the first track is written, and subsequently a third track is written that partially overwrites the second track, and so forth. Track widths are defined by the squeeze position or amount of overwrite on the next track rather than by the write pole width as is the case in today's hard drives.

One of the main advantages of shingled writing is that write pole width no longer needs to scale with the written track width. Thus, the opportunity for improved writability and higher device yield is not restricted by using pole width as a critical dimension to be tightly controlled. Secondly, adjacent track erasure (ATE) becomes less of an issue because tracks are written sequentially in a cross-track dimension and only experience a one time squeeze from the next track.

In today's PMR writer design, the geometries and dimensions of the main pole and side shields are key factors for both overwrite and dBER (delta bit error rate) performance in hard disk drives (HDD). In a fully coupled shield (FCS) where the trailing shield, leading shield, and side shields completely surround the main pole at the ABS, the side shields are first plated on the leading shield, then a conformal non-magnetic material is deposited to form a leading gap and side gaps on the exposed surface of leading shield, and sidewalls of the side shields, respectively. Next, the main pole is plated on the leading gap and side gaps. As a result, the main pole shape proximate to the ABS is mainly defined by the shape of adjacent portions of the side shields. There is always flux leakage between the side shields and main pole due to thin side gaps in current writer designs. A write head that can deliver or pack higher bits per inch (BPI) and higher tracks per inch (TPI) is essential to the area density improvement. If writeability can be sustained, the main pole size must shrink, and a thinner write gap at the main pole trailing (top) surface and a narrower side gap adjoining the main pole sides in the cross-track direction are preferred for better track field gradient (Hy_grad, BPI) and cross-track field gradient (Hy_grad_x, TPI), respectively. However, with extremely narrow magnetic spacing between the main pole and surrounding shields, internal flux shunting becomes severe and is the major factor for a dramatic decrease in OW and writability degradation.

Therefore, a new side shield and main pole design is needed to minimize internal flux shunting in order to provide improved writability while maintaining high TPI capability for advanced writers with thin side gaps.

SUMMARY

One objective of the present disclosure is to provide a main pole and side shield structure for a PMR writer that minimizes internal flux shunting to enable better writability while maintaining an excellent cross-track field gradient for side shield heights less than 80 nm.

Another objective of the present disclosure is to provide a method of making the main pole and side shield structure of the first objective.

According to one embodiment of the present disclosure, these objectives are achieved by forming a side shield made of a 10-16 kG magnetic layer on each side of a main pole in a cross-track direction at the ABS. Each side shield has a sidewall facing the main pole wherein a first sidewall section extends from the ABS at an angle γ of 0 to 40 degrees with respect to a center plane that bisects the main pole, and to a first height of 30 to 80 nm. There is a second sidewall section connected to an end of the first sidewall section at the first height, and formed substantially parallel to the ABS. The second sidewall section has a cross-track width of 20 to 300 nm and connects with a third sidewall section that extends to a side of the side shield. The main pole has a narrow front portion called a write pole at the ABS, and a wide back portion that adjoins the back end of the write pole between two corners at a third height from the ABS. Flared sides of the wide back portion extend from each of the two corners towards a back end of the PMR writer, and are separated by increasing cross-track distance as the distance from the ABS increases. The write pole preferably has a continuously curved sidewall on each side of the center plane wherein a first section of curved sidewall proximate to the ABS is formed at the angle γ, and a second section of curved sidewall proximate to each corner is formed at an angle that is 90±5 degrees with respect to the center plane. As a result, the write gap thickness between the first sidewall section of side shield and first section of write pole curved sidewall is substantially the same as that of the write gap portion between the second sidewall section and the second section of curved sidewall. Moreover, there is less coupling between the main pole and side shields to minimize internal flux shunting, and the main pole corners are formed closer to the ABS which means greater main pole volume proximate to the ABS and better writability.

In a second embodiment, each side shield may be a composite with an inner 19-24 kG magnetic (hot seed) layer adjoining the side gap on each side of the center plane, and an outer 10-16 kG magnetic layer adjoining a side of the hot seed layer that faces away from the main pole.

A method for forming the side shield and main pole structure of the present disclosure is provided. A side shield magnetic layer may be deposited on a substrate that corresponds to the leading shield. Then a photoresist is coated on the side shield magnetic layer and patterned to form a masking layer with openings that expose regions of side shield magnetic layer to be removed in a subsequent etch process. A key feature is the use of optical proximity correction (OPC) features in the photomask that may be chrome on quartz, which is employed for the patternwise exposure of the photoresist layer. The photoresist layer becomes a masking layer after patternwise exposure and development with an aqueous base solution, for example. In particular, opaque OPC shapes that may be chrome features are added to the photomask at the junction of an opening where a first chrome side formed at angle γ to the center plane intersects a second chrome side that is aligned orthogonal to the center plane. The added OPC shapes are responsible for avoiding excessive rounding at the intersection of first and second sides of the opening in the patterned masking layer. Thereafter, an etch process such as ion beam etching (IBE) is used to transfer the pattern in the masking layer through the side shield magnetic layer to generate side shields on each side of the center plane, and an opening between the side shields wherein the main pole will be formed. As a result, the first and second chrome sides on the photomask are responsible for forming the first and second sidewall sections, respectively, in each side shield.

After the masking layer is removed, a gap layer is conformally deposited on the side shields and exposed surfaces of the leading shield to form side gaps and a leading gap, respectively. Then, the main pole is plated on the gap layer, and from a top-down view, generally conforms to the shape of the side shield sidewall in a region proximate to the ABS. A chemical mechanical polish (CMP) process may be performed to produce a planar top (trailing) surface on the main pole that is coplanar with top surfaces of the side gaps and side shields. Then, the trailing shield and remainder of the write head may be fabricated by a conventional sequence of steps.

DETAILED DESCRIPTION

The present disclosure relates to a PMR writer with a side shield and main pole structure proximate to the ABS that minimizes internal flux shunting from the main pole to surrounding side shields, and enables a larger main pole volume within 150 nm of the ABS. The main pole may have one or both of a tapered leading side and tapered trailing side. The PMR writer may have a combined read head/write head structure as previously described in related patent application Ser. No. 14/690,693. Moreover, the main pole and side shield structures of the present disclosure are not limited to a particular write head design, and are compatible with either a non-double write shield (non-DWS) or double write shield (DWS) configuration as described in the aforementioned related patent application. In the drawings, the y-axis is a cross-track direction, the z-axis is a down-track direction, and the x-axis is in a direction orthogonal to the ABS and towards a back end of the device.

Figure 1:
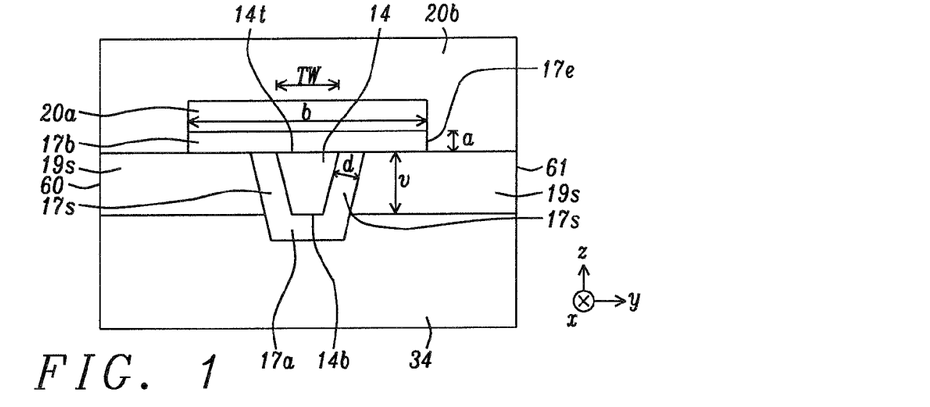
FIG. 1 is an ABS view of a PMR writer fabricated by the inventors using a process of record (POR) wherein the trailing shield, side shields, and leading shield form an all wrap around (AWA) shield structure around the main pole.

Referring to FIG. 1, an ABS view of a fully coupled shield (FCS) also known as an all wrap around (AWA) shield design currently fabricated by the inventors is shown wherein a main pole has a front portion referred to as a write pole with a medium facing side 14 comprised of leading edge 14b, and a trailing edge 14t which defines a track width TW. The main pole extends behind the plane of the ABS to a back portion (not shown) that is magnetically connected to the trailing shield comprised of an upper 16-19 kG magnetic layer 20b and a 19-24 kG hot seed layer 20a where the hot seed layer and write gap 17b have a cross-track width b. The write gap has thickness a.

Side shields 19s are made of a 10-16 kG magnetic layer, have a down-track thickness v, and are separated from the write pole by a side gap 17s having a cross-track width d. Each side shield has a top surface that adjoins trailing shield layer 20b between a side 17e of the write gap and a side 60 (or 61) of the side shield. There is also a leading shield 34, which is separated from leading edge 14b by a lead gap 17a. The leading shield adjoins the side shields, and with the 16-19 kG magnetic layer 20b thereby forms an AWA shield design to improve field gradients in the down-track and cross-track directions as well as adjacent track erasure (ATE) performance.

Figure 2A:
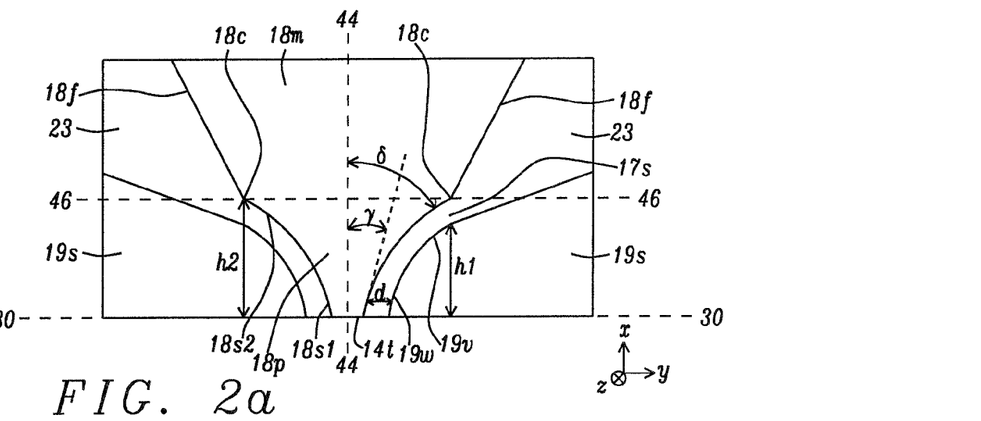
FIG. 2a is a top-down view of the PMR writer in FIG. 1 wherein the trailing shield and write gap are removed to depict the main pole and side shields.

FIG. 2a shows a top-down view of the side shield and main pole structure in FIG. 1 with the trailing shield and write gap removed. The main pole and side shields have a process of record (POR) design. Center plane 44-44 bisects the main pole including a back portion 18m and is aligned orthogonal to the ABS 30-30. A front portion of the main pole also known as the write pole 18p has a trailing edge 14t at the ABS, and has a curved sidewall on each side of the center plane wherein a first portion 18s1 of curved sidewall is proximate to the ABS, and a second portion 18s2 is proximate to corner 18c where the curved sidewall connects with flared side 18f of the main pole back portion. First portion 18s1 forms an attack angle γ from 0 to 40 degrees, and preferably 18-20 degrees, with respect to center plane 44-44. In general, as the angle γ increases, the cross-track magnetic field gradient degrades. However, as angle γ approaches 0 degrees, the magnetic field from the main pole decreases dramatically. Therefore, we have found that γ=18 to 20 degrees is an optimum range to maintain an acceptable cross-track field gradient and magnetic field from the main pole. Preferably, a first portion of side shield sidewall 19w that is a side gap distance d from first portion 18s1 also is formed at the γ angle with respect to the center plane.

Side shields 19s have a second sidewall portion 19v facing the write pole and formed substantially conformal to curved sidewall portion 18s2 up to height h1 of at least 80-100 nm where the sidewall 19v no longer follows the shape of the write pole and continues to an end 19e at sides 60 (or 61) of the side shield. The closest approach of main pole back portion 18m to the ABS is at plane 46-46 that includes corners 18c and is a second height h2 of >150 nm from the ABS. Curved sidewall portion 18s2 and second sidewall portion 19v that are proximate to corners 18c form a maximum angle δ of about 60 degrees with respect to center plane 44-44.

Figure 2B:
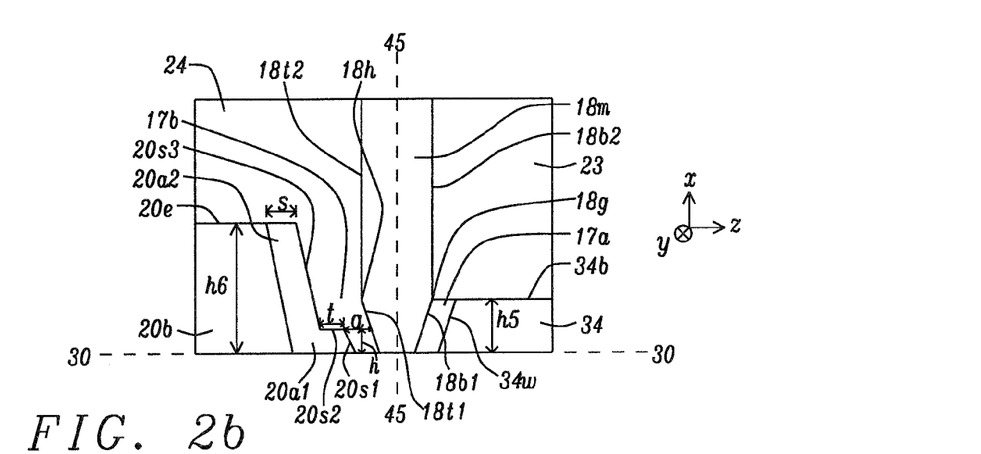
FIG. 2b is a down-track cross-sectional view of the PMR writer in FIG. 1.

FIG. 2b depicts a down-track cross-sectional view of the trailing shield and leading shield structure along center plane 44-44 in FIG. 2a. The main pole has a tapered leading side 18b1 with a first end at the ABS 30-30 and a back end at corner 18g. A second leading side 18b2 adjoins a dielectric layer 23, extends from corner 18g toward a back end of the PMR writer, and parallel to plane 45-45 that is formed orthogonal to the ABS. The main pole also has a tapered trailing side 18t1 between the ABS and corner 18h. A second trailing side 18t2 adjoins a dielectric layer 24, has a front end at corner 18h and extends toward a back end of the PMR writer, and parallel to plane 45-45. The leading shield 34 has a front side at the ABS, and a backside 34b at a height h5 from the ABS where the backside contacts dielectric layer 23. Leading gap 17a and write gap 17b contact main pole sides 18b1, 18t1, respectively.

Write gap 17b preferably has a uniform thickness in a down-track direction, is formed between a tapered section 20a1 of the trailing shield hot seed layer and main pole trailing side 18t1, and has a back side that adjoins a front side of insulation layer 24. Tapered section 20a1 has a front side at the ABS 30-30, a back side 20s2 at height h, and a main pole facing side 20s1 separated from trailing side 18t1 by write gap thickness a, and that is substantially parallel to the main pole tapered trailing side. A second section 20a2 of the trailing shield hot seed layer 20a from FIG. 1 adjoins the back side of tapered section 20a1 at height h, has a back side that adjoins an ABS facing side of non-magnetic layer 24 at height h6, and has a tapered side 20s3 facing the main pole and offset therefrom by a down-track distance of (a+t), and having a lengthwise dimension (h6−h) along the x-axis that is parallel to plane 45-45. When t>0, coupling and internal flux leakage from the main pole to trailing shield is reduced compared with a condition where t=0. In the exemplary embodiment, the back side of second section 20a2 is formed at the same height h6 as the back side 20e of the second magnetic layer 20b in the trailing shield. Tapered section 20a1 has a down-track distance (s+t) while section 20a2 has a down-track thickness s.

We have discovered that increasing the write pole curvature in FIG. 2a and moving a front side of main pole back portion 18m between corners 18c substantially closer to the ABS than in the POR design leads to reduced main pole to side shield flux shunting and enhanced cross-track gradient. Curvature is defined as the difference in angles γ and δ, which is a maximum of around 60 degrees in the POR design, and typically about 30-40 degrees when γ is 18 degrees and δ is in a range of 45 to 60 degrees. Previous attempts to move corners 18c closer to the ABS involved enlarging the attack angle γ, which causes unacceptable degradation in cross-track field gradient. Greater curvature in the write pole sides in the present disclosure is achieved by reducing side shield height in a first side facing the write pole, and including a second side in each side shield that is formed essentially parallel to the ABS and connected to an end of the first side as explained in a first embodiment illustrated in FIG. 3. As a result, there is less coupling between side shields and the main pole than in the POR design which reduces internal flux shunting and improves writability (overwrite). Furthermore, the first embodiment enables more main pole volume within 150 nm of the ABS while maintaining an acceptable γ angle to enhance the cross-track field gradient (TPI capability).

Figure 3:
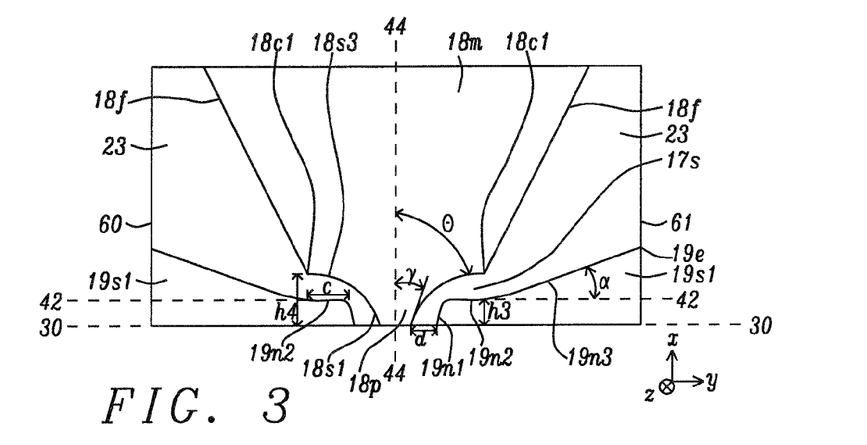
FIG. 3 is a top-down view of a PMR writer wherein main pole and side shield shapes are formed according to a first embodiment of the present disclosure.

Referring to FIG. 3, a first embodiment of the present disclosure is illustrated where main pole flared sides 18f and the first portion 18s1 of curved write pole sidewall are retained from the POR design in FIG. 2a. It should understood that the ABS view of the first embodiment is the same as in FIG. 1 except for replacing side shields 19s with side shields 19s1. Moreover, the down-track cross-sectional view along plane 44-44 of the first embodiment structure is the same as depicted in FIG. 2b. One key feature of the first embodiment of the present disclosure shown in FIG. 3 is a modified side shield 19s1 on each side of the center plane 44-44. In particular, each side shield has a first sidewall section 19n1 proximate to the ABS 30-30 and substantially conforming to the shape of first curved sidewall portion 18s1 aligned at angle γ with respect to the center plane. Angle γ is also referred to as the attack angle and is between 0 and 40 degrees, and preferably from 18 to 20 degrees. Thus, first sidewall section 19n1 has a front end at the ABS, and is separated from first portion 18s1 of curved write pole sidewall by side gap distance d up to a height h3 that is 30-80 nm from the ABS, and significantly less than h1 in the POR design. A back end of the first sidewall section is at height h3. The side gap distance d is a cross-track width in the range of 20 to 60 nm. Each side shield has a second sidewall section 19n2 formed substantially parallel to the ABS at height h3, and having a cross-track width c of 20 to 300 nm, and preferably 20-100 nm, between the back end of the first sidewall section and a third sidewall section 19n3. If c>300 nm and h3<80 nm, then the side shield could become saturated with loss in TPI. The third sidewall section extends to a far end 19e at a side 60 (or 61) of the side shield where the far end is a greater distance than h3 from the ABS. Each third sidewall section preferably forms an angle α of 20 to 60 degrees with respect to plane 42-42 which includes second sidewall 19n2. Throat height in the write pole 18p is the distance along center plane 44-44 between the ABS and plane 42-42.

A second key feature of the first embodiment is greater curvature in the curved write pole sidewall compared with the design in FIG. 2a that is enabled by reducing the height of the first sidewall section 19n1 to h3, and by including second sidewall section (side) 19n2 as described previously. As a result, there is a second portion 18s3 of curved write pole sidewall formed proximate to corner 18c1 that is substantially parallel to side 19n2 and at an angle θ of preferably 90±5 degrees with respect to center plane 44-44. Greater curvature in the write pole sidewall, expressed here as (θ−γ) with a maximum value in the range of 90-95 degrees, and typically around 70 degrees, allows corners 18c1 to be at a height h4 of 80 to 150 nm from the ABS, a substantial reduction from height h2 of corners 18c in the POR design. In the exemplary embodiment, side gap 17s is substantially uniform since there is a distance d between sidewall portion 18s3 and second sidewall section 19n2.

Figure 4:
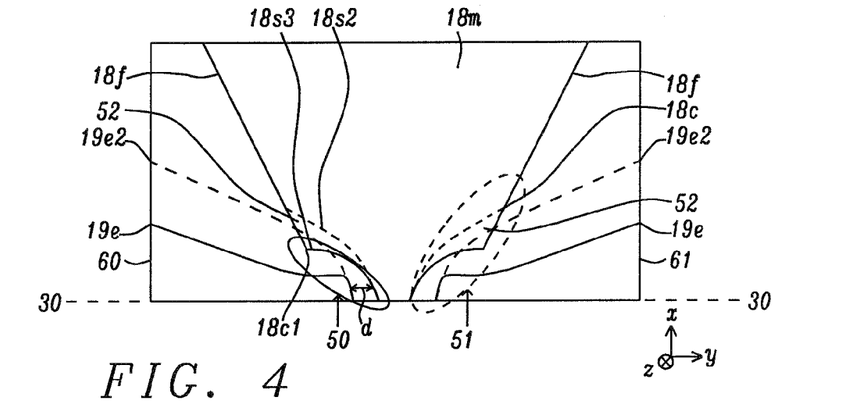
FIG. 4 is an overlay of FIG. 3 on FIG. 2a that shows less main pole-side shield coupling and a greater main pole volume proximate to an air bearing surface with the main pole and side shield design of the first embodiment.

FIG. 4 shows a top-down view of the overlay of the main pole and side shield structure of the present disclosure with the main pole and side shield of the POR design from FIG. 2a. Note that flared main pole sidewalls 18f are shared by both designs. However, in other locations, solid lines represent the first embodiment from FIG. 3 and dashed lines represent the POR design from FIG. 2a. First, there is clearly more main pole volume closer to the ABS in the first embodiment structure as indicated by regions 52 between write pole curved sidewall portions 18s3 and 18s2. The area of regions 52 between the two curves represents a portion of the main pole that is moved closer to the ABS in the present disclosure, and is responsible for better overwrite in the first embodiment design.

A second advantage of the first embodiment is less side shield volume in side shields 19s1 than in side shields 19s that minimizes internal flux leakage from the main pole to side shields. The greater distance between the ABS and corners 18c than between the ABS and corners 18c1 along the curved write pole sidewall means there is less coupling (less flux leakage) in region 50 where side shield 19s1 (sections 19n1+19n2 in FIG. 3) follows the contour of the curved write pole sidewall than in region 51 where side shield 19s (sections 19w+19v in FIG. 2a) follows the contour of the curved write pole sidewall. In other words, region 50 is considerably smaller than region 51 and this area reduction leads to less coupling since smaller area is directly related to less coupling when the side gap distance d is held constant.

We disclosed in related patent application Ser. No. 14/690,693 (illustrated in FIG. 5 therein) a PMR writer with a composite side shield structure that may be employed to further improve overwrite, especially at side shield heights less than 150 nm. Each side shield has a high saturation magnetization (hot seed) layer made of 19-24 kG material formed at an interface with the side gap, and a second magnetic (10-16 kG) layer adjoining a side of the hot seed layer that is opposite the side gap. Furthermore, the leading shield preferably has an uppermost hot seed layer that interfaces with the lead gap and connects with the side shield hot seed layers, and a lower magnetic layer made of 10-16 kG material that adjoins the second magnetic layers in the side shields. As a result, when side gap d is reduced to a 20-60 nm range, and side shield height is decreased to 0.15 micron or less, side shield saturation may be prevented while writability is maintained or enhanced.

Figure 5:
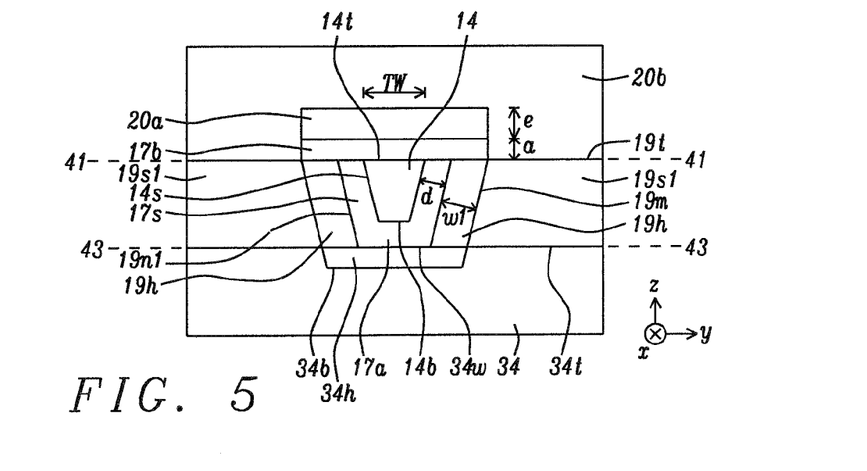
FIG. 5 is an ABS view of a PMR writer wherein a main pole and composite side shields are formed according to a second embodiment of the present disclosure.

Referring to FIG. 5, an ABS view of a modified AWA shield structure fabricated by the inventors is shown and is formed according to a second embodiment of the present disclosure. The trailing shield design from FIG. 1 is retained. However, the side shields and leading shield are configured to include a hot seed layer that interfaces with side gaps 17s and leading gap 17a, respectively. There is a leading shield hot seed layer 34h formed with a top surface 34w along a plane 43-43 that includes a bottom surface of the leading gap 17a and a top surface 34t of side portions of the leading shield layer 34. Hot seed layer 34h is aligned below the write pole leading edge 14b and has bottom surface 34b. Thus, the leading shield is considered to be a composite with a lower magnetic layer 34 made of a 10-16 kG material, and an upper hot seed layer 34h made of a 19-24 kG material wherein the latter has a substantially smaller cross-track width than the former. All shield layers and the main pole may be selected from one of CoFeN, CoFeNi, NiFe, or CoFe.

Adjoining both ends of the hot seed layer 34h at a top surface formed along plane 43-43 is a side shield hot seed layer 19h that is preferably comprised of the same material and with a cross-track width w1 that is equal to the down-track thickness of the leading shield hot seed layer. Hot seed layer 19h has a bottom surface at plane 43-43 and a top surface at plane 41-41 which includes the write pole trailing edge 14t at the ABS. Each hot seed layer 19h has an inner side 19n1 facing a write pole side edge 14s and adjoining side gap 17s, and has an outer side 19m facing away from the side gap and adjoining a side shield layer 19s1. Preferably, both sides 19n1, 19m are aligned substantially parallel to a nearest write pole side edge 14s. Therefore, each side shield is considered to be a composite with an "inner" hot seed layer 19h, and an "outer" shield layer 19s1 made of a 10-16 kG material. Preferably, thickness w1 is from 10 to 100 nm, and more preferably, is from 20 to 60 nm. According to the exemplary embodiment, side shield hot seed layers 19h are not magnetically coupled to the trailing shield hot seed layer 20a. In other embodiments, w1 may be increased and the write gap may have a narrower cross-track width than hot seed layer 20a such that the trailing shield hot seed layer contacts plane 41-41 adjacent to the write gap thereby allowing the hot seed layers 19h to partially or fully contact hot seed layer 20a.

Figure 6:
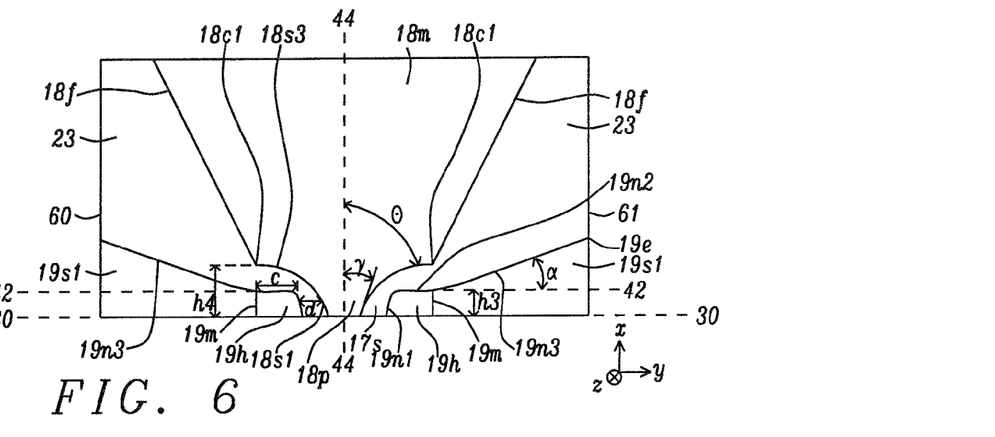
FIG. 6 is a top-down view of the PMR writer in FIG. 5 wherein the trailing shield and write gap are removed to depict the main pole and composite side shields.

Referring to FIG. 6, a top-down view of the main pole and composite side shield structure from FIG. 5 is shown with the write gap and trailing shields removed. The configuration from FIG. 2a is retained except for the side shield structure wherein hot seed layer 19h is inserted between side shield layer 19s1 and side gap 17s. In one embodiment, hot seed layer 19h has a cross-track width where w1 corresponds to the cross-track width c of side 19n2. Thus, outer side 19m may be aligned directly below corner 18c1. In other embodiments, cross-track width c may be increased so that a far end of side 19n2 that intersects with outer side 19m is extended towards side 60 (or 61), and is a greater distance from center plane 44-44 than corner 18c1. In the exemplary embodiment, sides 19n1, 19n2 are part of hot seed layer 19h, and side 19n3 is part of side shield layer 19s1.

Figure 7:
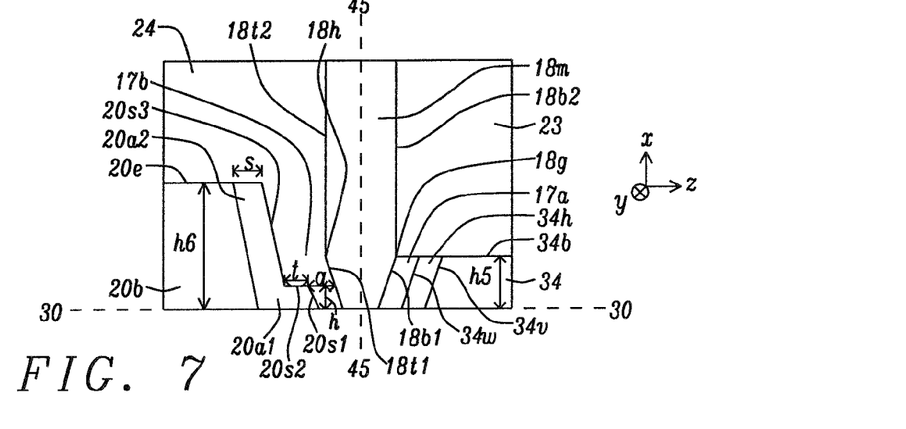
FIG. 7 is a down-track cross-sectional view of the PMR writer in FIG. 5.

FIG. 7 depicts a down-track cross-sectional view along plane 44-44 in FIG. 5 and retains the features of FIG. 2b except leading shield hot seed layer 34h is inserted between leading gap 17a and leading shield 34 from the ABS 30-30 to height h5. Hot seed layer 34h has side 34w adjoining the leading gap and side 34v that faces away from the leading gap and adjoins the leading shield. Preferably, sides 34w, 34v are substantially parallel to tapered main pole leading side 18b1.

To further demonstrate the advantages of the present disclosure, a finite element method (FEM) simulation was performed where a PMR writer with the POR design in FIG. 1 and FIGS. 2a-2b has the following dimensions: d=40 nm, γ=18 degrees, δ=45 degrees, h1=130 nm, and h2=180 nm. The POR design was compared with a PMR writer having a main pole and side shield design formed according to the first embodiment and shown in FIG. 3 where d=40 nm, c=60 nm, γ=18 degrees, θ=90 degrees, h3=50 nm, and h4=90 nm. The side shield structure and main pole in the POR design are made of the same 10-16 kG and 19-24 kG materials, respectively, as in the side shield and main pole configuration of the first embodiment.

Figure 8:
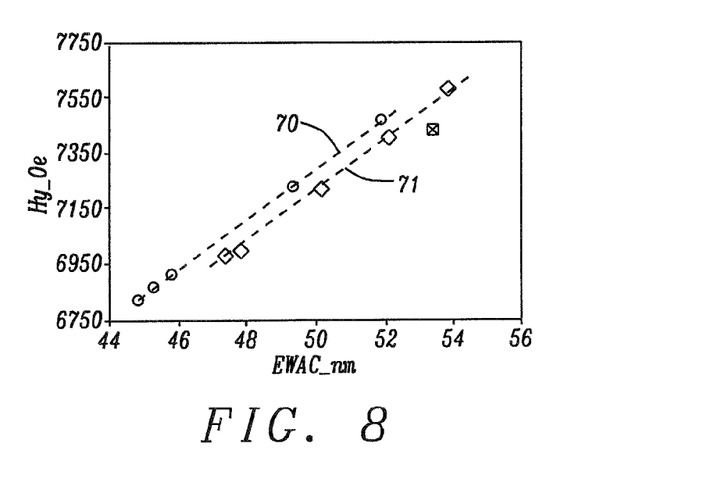
FIG. 8 is a plot comparing Hy vs. erase width during AC mode for a PMR writer having the POR structure in FIG. 2 with the first embodiment structure in FIG. 3.

In FIG. 8, improved writability for the first embodiment configuration is illustrated on a graph of Hy_max Oe vs. erase width during AC mode (EWAC) where results from the main pole and AWA shield of the present disclosure are plotted along line 60 and have higher values for Hy (Oe) at each EWAC value in nm than the POR design with points along line 61.

Figure 9:
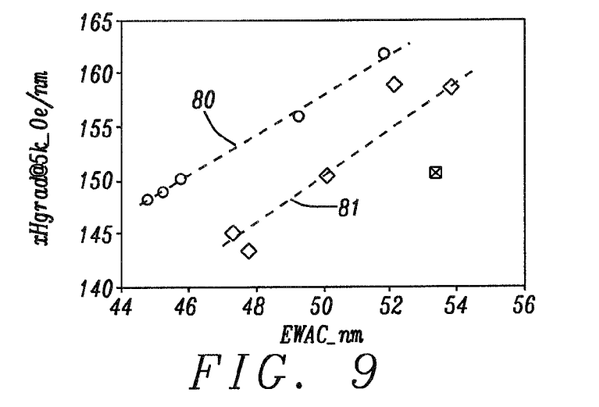
FIG. 9 is a plot comparing Hy grad x @ 5K Oe/nm vs. erase width during AC mode for a PMR writer having the POR structure in FIG. 2 with the first embodiment structure shown in FIG. 3.

FIG. 9 shows an improved cross-track field gradient for line 70 representing results from the first embodiment configuration compared with line 71 representing the POR design. Hy_grad_x results are plotted vs. EWAC (nm).

The present disclosure also encompasses a method of forming a PMR writer where a first side shield side facing the write pole proximate to the ABS has a height from 30 to 80 nm, the side shield has a second side formed parallel to the ABS, and where the curved write pole side proximate to a main pole corner has a sidewall portion formed at a 90±5 degree angle with respect to a center plane aligned orthogonal to the ABS. FIGS. 10-17 depict a sequence of steps whereby the main pole and side shield structure of the first embodiment are fabricated.

Figure 10:
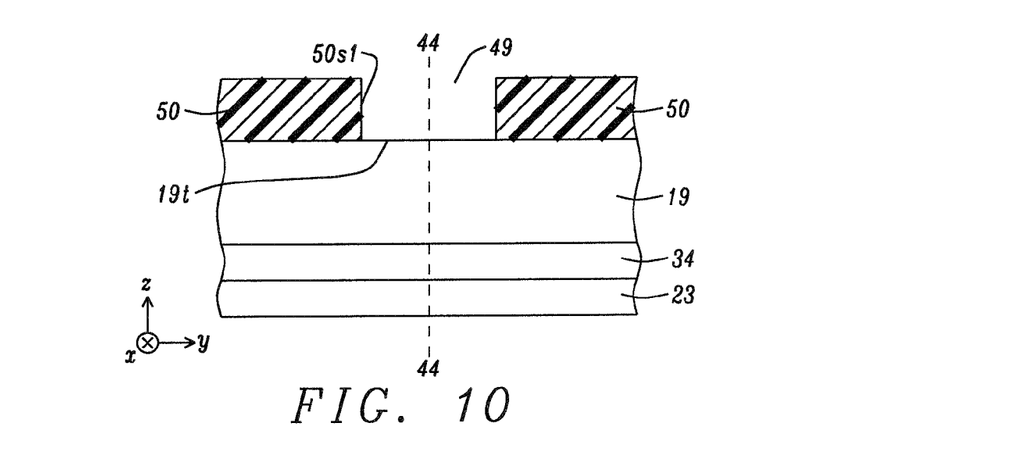
FIGS. 10 and 14-17 are ABS views depicting a sequence of steps employed to fabricate a main pole and side shield structure according to a first embodiment of the present disclosure.

Referring to FIG. 10, leading shield 34 is formed on a dielectric layer 23 by a conventional method. Then, magnetic layer 19 is plated on the leading shield. A photoresist layer 50 is coated and patternwise exposed through a photomask, for example, that may comprise opaque chrome features on a transparent quartz substrate. The photolithography process forms an opening 49 with sidewalls 50s1 on each side of the center plane 44-44 which exposes a portion of magnetic layer top surface 19t.

Figure 11:
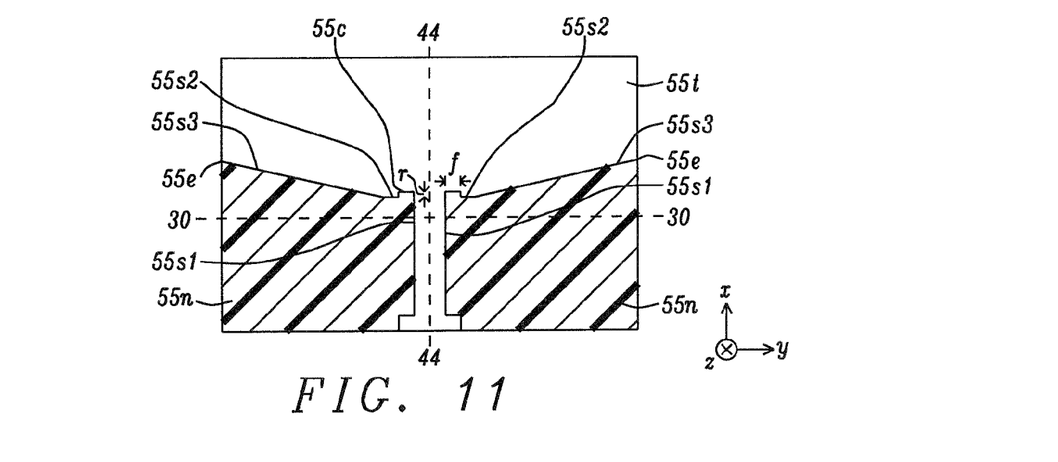
FIG. 11 is a top-down view of a photomask design with OPC features that is used to fabricate the side shield structure according to a first embodiment.

In FIG. 11, the photomask 55 is overlaid on the photoresist layer (not shown) during the exposure step in the photolithography process. The photomask comprises a transparent region 55t and a pattern of opaque features 55n that are bounded on one side by sidewalls 55s1 formed preferably at angle γ with respect to a center plane 44-44 that will bisect the main pole to be plated in a subsequent step. Sidewalls 55s1 will determine the position of sidewalls 50s1 after the patternwise exposure and a typical aqueous base development step. Likewise, the opaque photomask features have a second side 55s3 with a far end 55e on each side of the center plane. Sides 55s3 will determine the position of sidewalls 19n3 to be formed in each side shield 19s1. A third side 55s2 for each opaque photomask feature is connected to a near end of side 55s3, is formed orthogonal to the center plane, and is aligned above where sidewall 19n2 will be formed in each side shield. A key feature is the use of an opaque or partially opaque OPC shape 55c on each side of the center plane, and at an intersection of side 55s2 and side 55s1. Each OPC shape is preferably rectangular with a cross-track width f, and a height r along the x-axis direction. The OPC shapes are advantageously employed to provide corners 50p with essentially no rounding at the intersection of sides 50s3 and 50s1 in the patterned photoresist layer 50 shown in FIG. 12. In the prior art, the absence of OPC shapes leads to considerable rounding in side 19w (FIG. 2a) and a continuously curved side shield sidewall (19w+19v) after a subsequent etching step.

Figure 12:
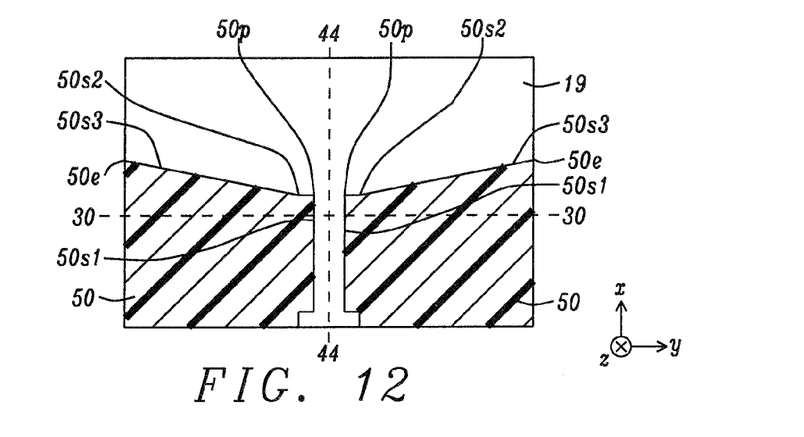
FIGS. 12-13 are top-down views showing intermediate process steps during the fabrication of the main pole and side shields according to the first embodiment.

Referring to FIG. 12, a top-down view of the patterned photoresist layer 50 from FIG. 10 is illustrated. As mentioned previously, OPC shapes in the photomask are used to form a photoresist side 50s2 on each side of the center plane that is essentially parallel to the ABS 30-30, and intersects with a photoresist side 50s1 to form a corner 50p where sides 50s1, 50s2 intersect. Side 50s3 connects with a far end of side 50s2 and extends to end 50e above where side 60 (or 61) is formed in the side shield. Preferably, each side 50s2 has a cross-track width c corresponding to the cross-track width of side 19n2 in each side shield 19s1 at the completion of the fabrication sequence.

Figure 13:
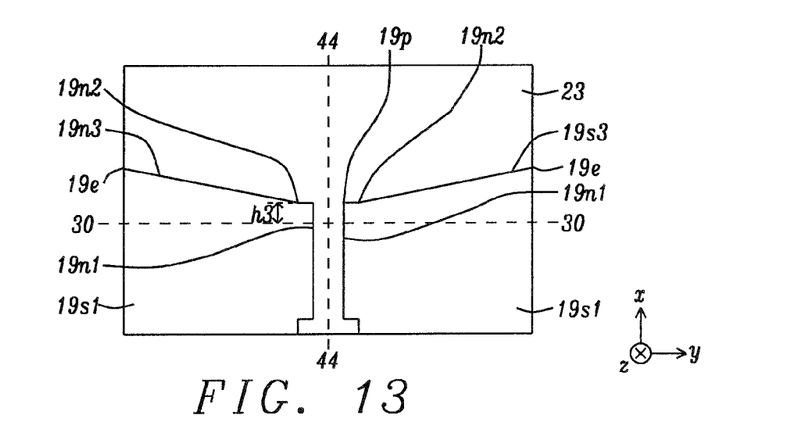

In FIG. 13, a conventional etch process such as an ion beam etch (IBE) is employed to transfer the opening in the photoresist pattern (masking layer) through the magnetic layer 19 and stop on leading pole layer 34. The masking layer is then removed by a well known method. As a result, sides 19n1, 19n2, 19n3 are formed by way of their alignment below sides 50s1, 50s2, 50s3, respectively, during the etch process. Side 19n2 is at a height h3 from the eventual ABS 30-30. Typically, height h5 of the underlying leading shield 34 is less than h3 such that the leading shield is covered by the side shields and is not visible from a top view at this point. Dielectric layer 23 adjoins sides 19n1-19n3.

Figure 14:
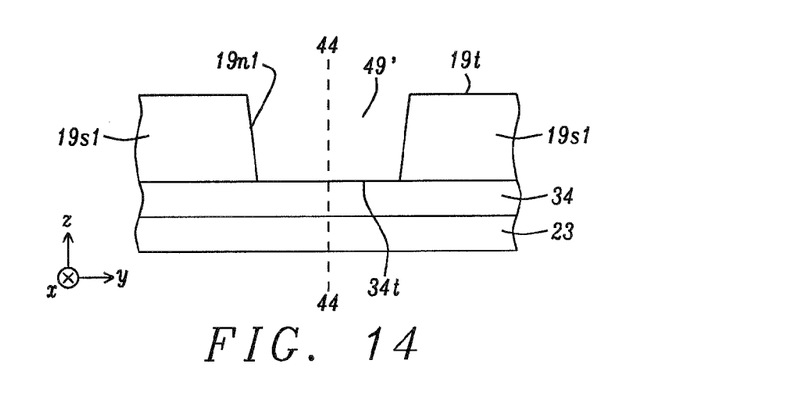

FIG. 14 shows an ABS view of the structure in FIG. 13. A portion of top surface 34t of the leading shield is exposed between sides 19n1 and below opening 49'. Side shields 19s1 are formed from magnetic layer 19 in FIG. 10 and have a top surface 19t.

Figure 15:
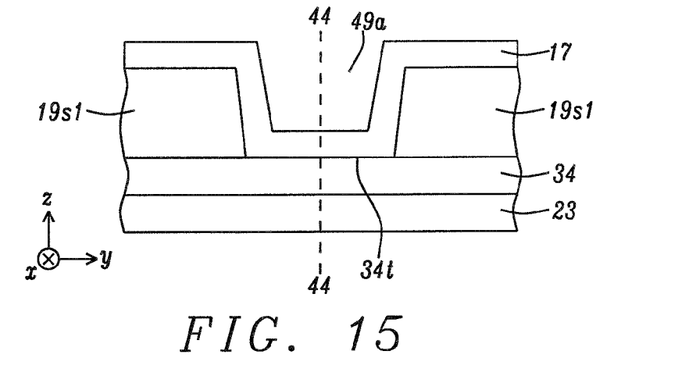

Thereafter, in FIG. 15, gap layer 17 is conformally deposited on side shields 19s1 and on leading shield top surface 34b. Opening 49a is formed between the side shields and in the gap layer. The gap layer may comprise two or more layers such as an inner Ru layer and an outer dielectric layer contacting each side shield. The outer dielectric layer (not shown), dielectric layer 23, and dielectric layer 24 (not shown) may be comprised of alumina, or other insulation materials used in the art.

Figure 16:
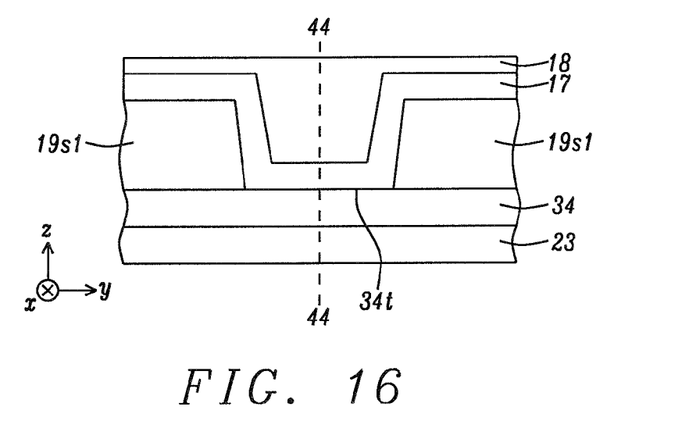
Figure 17:
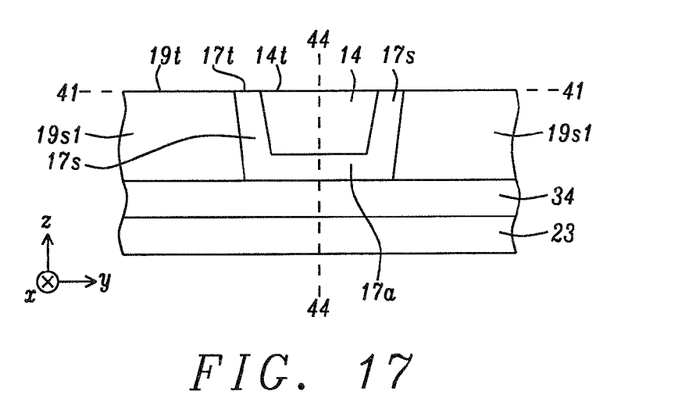

In FIG. 16, the main pole layer 18 is plated to fill the opening 49a and typically covers the top surface 19t of the side shields 19s1. Next, as depicted in FIG. 17, a chemical mechanical polish (CMP) process may be performed to form a trailing edge 14t along plane 41-41 that also includes a top surface of each side shield 19s1 and a top surface 17t of each side gap 17s. Note that side gaps 17s and leading gap 17a are formed from gap layer 17. The main pole becomes the write pole 14 at the eventual ABS. A conventional process may be used to form a taper on the trailing main pole side including the write pole at this point in the fabrication.

The write gap and composite trailing shield are then formed on the main pole including write pole 14, side gaps 17s, and side shields 19s1 by a conventional process to complete the AWA shield structure shown in FIG. 1 from an ABS view, and the side shield structure in FIG. 3 according to a top-down view. A lapping process is generally performed after all layers in the PMR writer are formed to generate the ABS 30-30 in FIG. 3.

The PMR writer of the present disclosure may be used in conventional magnetic recording (CMR) and SMR applications. Although the exemplary embodiments depict an all wrap around shield structure, the main pole and side shield structure of the embodiments disclosed herein may also be employed in a partially wrapped around shield structure wherein the leading shield is removed as we have described in related patent application Ser. No. 14/813,887. The partially wrapped around shield design provides for reduced flux leakage from main pole to side shields, improves writeability as well as cross-track and down-track field gradients thereby enabling side gap and write gap dimensions 5-10 nm smaller than typical writers for conventional and shingled magnetic recording.

While the present disclosure has been particularly shown and described with reference to, the preferred embodiment thereof, it will be understood by those skilled in the art that various changes in form and details may be made without departing from the spirit and scope of this disclosure.

We claim:

1. A perpendicular magnetic recording (PMR) writer, comprising:
   (a) a main pole with a leading edge at an air bearing surface (ABS) and formed at a first plane, and a trailing edge at the ABS and formed at a second plane where the first and second planes are parallel to each other and are orthogonal to the ABS and to a center plane formed equidistant between two main pole sides that connect the leading edge and trailing edge;
   (b) a gap layer surrounding the main pole at the ABS and comprising a write gap that contacts the trailing edge and has a first cross-track width, and a side gap layer adjoining the main pole sides and leading edge;
   (c) a side shield comprising a 10-16 kG magnetic layer on each side of the center plane, each side shield comprises;
      (1) a first sidewall with a front end at the ABS and a back end at a first height from the ABS, the first sidewall has a first angle γ with respect to the center plane and faces a write pole portion of the main pole;
      (2) a second sidewall that is parallel to the ABS and the first height therefrom, and with a first end that connects to the back end of the first sidewall, and a second end that connects with a third sidewall; and
      (3) the third sidewall that extends from the second sidewall to a far end at a side of the side shield; and
   (d) a composite trailing shield, comprising:
      a 19-24 kG hot seed layer adjoining a top surface of the write gap, and a 16-19 kG magnetic layer that adjoins a top surface and sidewalls of the hot seed layer, and contacts a top surface of each side shield at the second plane, and wherein the write pole portion of the main pole has a curved side on each side of the center plane, each curved side extends from the ABS to a corner where the write pole curved side adjoins a flared side of a main pole back portion, a first portion of each curved side proximate to the ABS is formed at the first angle γ with respect to the center plane, and a second portion of each curved side proximate to the corner has a second angle θ of about 90±5 degrees with respect to the center plane where θ>γ.

2. The PMR writer of claim 1 further comprised of a leading shield with a top surface contacting a portion of the side gap layer below the main pole leading edge, the leading shield, side shields, and 16-19 kG magnetic layer in the composite trailing shield form an all wrap around (AWA) shield structure.

3. The PMR writer of claim 1 wherein the first angle γ is from 0 to 40 degrees.

4. The PMR writer of claim 1 wherein the first height is from 30 to 80 nm.

5. The PMR writer of claim 1 wherein the second sidewall has a cross-track width of 20 to 300 nm.

6. The PMR writer of claim 1 wherein the corner where each curved side adjoins the main pole back portion is 80 to 150 nm from the ABS.

7. The PMR writer of claim 1 wherein the side gap layer has a cross-track width from 20 to 60 nm.

8. The PMR writer of claim 1 wherein the far end of the third sidewall is a greater distance from the ABS than the first height, and the third sidewall forms an angle of about 20 to 60 degrees with respect to a plane that includes the second sidewall.

* * * * *